(12) United States Patent
Sato

(10) Patent No.: US 10,582,073 B2
(45) Date of Patent: Mar. 3, 2020

(54) COMPUTER-READABLE MEDIUM AND INFORMATION PROCESSING DEVICE FOR PREVENTING ERRONEOUS RECOGNITION OF AUTHENTICATION RESULT

(71) Applicant: BROTHER KOGYO KABUSHIKI KAISHA, Nagoya, Aichi (JP)

(72) Inventor: Hirokazu Sato, Aichi (JP)

(73) Assignee: Brother Kogyo Kabushiki Kaisha, Nagoya-shi, Aichi-Ken (JP)

( * ) Notice: Subject to any disclaimer, the term of this patent is extended or adjusted under 35 U.S.C. 154(b) by 0 days.

(21) Appl. No.: 16/278,919

(22) Filed: Feb. 19, 2019

(65) Prior Publication Data

US 2019/0268490 A1 Aug. 29, 2019

(30) Foreign Application Priority Data

Feb. 28, 2018 (JP) ................. 2018-035251

(51) Int. Cl.
*G06F 3/12* (2006.01)
*H04N 1/00* (2006.01)
*G06F 21/60* (2013.01)
*H04N 1/32* (2006.01)
*G06F 16/955* (2019.01)

(52) U.S. Cl.
CPC ..... *H04N 1/00464* (2013.01); *G06F 16/9566* (2019.01); *G06F 21/606* (2013.01); *H04N 1/0048* (2013.01); *H04N 1/32* (2013.01)

(58) Field of Classification Search
CPC .. H04N 1/00464; H04N 1/32; G06F 16/9566; G06F 21/606

USPC .................................. 358/1.1–1.18
See application file for complete search history.

(56) References Cited

U.S. PATENT DOCUMENTS

| 2013/0036307 A1* | 2/2013 | Gagliano | H04L 9/321 |
| | | | 713/171 |
| 2014/0096241 A1* | 4/2014 | Li | H04L 63/12 |
| | | | 726/22 |
| 2015/0178026 A1* | 6/2015 | Sato | G06F 3/1238 |
| | | | 358/1.14 |

(Continued)

FOREIGN PATENT DOCUMENTS

JP 2014-045461 A 3/2014

*Primary Examiner* — Gabriel I Garcia
(74) *Attorney, Agent, or Firm* — Scully, Scott, Murphy & Presser, PC

(57) ABSTRACT

A non-transitory computer-readable medium stores computer-executable instructions including an application. The application is configured to cause a processor of an information processing device to, in response to accepting an authentication instruction, activate a local server and a browser, and instruct the browser to display an authentication screen of a cloud server and to specify the local server as a redirection destination. The local server is configured to cause the processor to, in response to receiving a request from the browser, determine whether the request is a particular request other than the redirection request, when determining that the request is not the particular request, instruct the browser to display a completion screen including a result of the authentication, and terminate the local server, and when determining that the request is the particular request, respond to the particular request, without terminating the local server.

13 Claims, 8 Drawing Sheets

(56) References Cited

U.S. PATENT DOCUMENTS

2016/0119342 A1* 4/2016 Kus .................... H04L 63/0876
                                                                                       713/154
2017/0272607 A1* 9/2017 Tamura .............. H04N 1/00344

* cited by examiner

US 10,582,073 B2

COMPUTER-READABLE MEDIUM AND INFORMATION PROCESSING DEVICE FOR PREVENTING ERRONEOUS RECOGNITION OF AUTHENTICATION RESULT

CROSS-REFERENCE TO RELATED APPLICATION

This application claims priority under 35 U.S.C. § 119 from Japanese Patent Application No. 2018-035251 filed on Feb. 28, 2018. The entire subject matter of the application is incorporated herein by reference.

BACKGROUND

Technical Field

Aspects of the present disclosure are related to a non-transitory computer-readable medium and an information processing device for preventing erroneous recognition of a result of authentication for accessing a cloud server.

Related Art

In recent years, technologies using a cloud server on the Internet have been known in which data is uploaded or downloaded between an information processing device (e.g., a PC and a smartphone) and a storage server provided by the cloud service. For instance, a technology to upload scanned image data generated by an image scanner to the cloud server has been disclosed.

SUMMARY

In an application program (hereinafter, simply referred to as an "application") executable by the information processing device to use the cloud service, a user is required to perform operations to initiate authentication for accessing the cloud server. Nonetheless, in the authentication with the application, there is a potential risk that a result of the authentication might be erroneously recognized. Thus, there is room for improvement in a procedure of the authentication with the application.

Aspects of the present disclosure are advantageous to provide one or more improved techniques that make it possible to reduce a potential risk that an authentication result might be erroneously recognized in an attempt to access a cloud server with an application executed by an information processing device.

According to aspects of the present disclosure, a non-transitory computer-readable medium is provided, which stores computer-executable instructions including an application configured to, when executed by a processor of an information processing device, cause the processor to accept an authentication instruction to initiate authentication for accessing a cloud server, and in response to accepting the authentication instruction, activate a local server configured to cause the processor to serve as a web server of a local host, and activate a browser incorporated in the information processing device, and instruct the browser to display an authentication screen provided by the cloud server and to specify the local server as a redirection destination for a redirection request, the redirection request including authentication information acquired from the cloud server via the authentication screen The local server is further configured to, when executed by the processor, cause the processor to, in response to receiving a request from the browser after activating the browser, determine whether the received request is a particular request other than the redirection request, when determining that the received request is not the particular request, instruct the browser to display a completion screen including a result of the authentication, after instructing the browser to display the completion screen, and terminate the local server, and when determining that the received request is the particular request, execute an operation responsive to the particular request, without terminating the local server.

According to aspects of the present disclosure, further provided is a non-transitory computer-readable medium storing computer-executable instructions, which include an application configured to, when executed by a processor of an information processing device, cause the processor to accept an authentication instruction to initiate authentication for accessing a cloud server, and in response to accepting the authentication instruction, activate a local server configured to cause the processor to serve as a web server of a local host, and activate a browser incorporated in the information processing device, and instruct the browser to display an authentication screen provided by the cloud server and to specify the local server as a redirection destination for a redirection request, the redirection request including authentication information acquired from the cloud server via the authentication screen. The local server is further configured to, when executed by the processor, cause the processor to, in response to receiving the request from the browser after activating the browser, determine whether the received request is the redirection request, when determining that the received request is the redirection request, instruct the browser to display the completion screen including the result of the authentication, and terminate the local server, and when determining that the received request is not the redirection request, execute an operation responsive to the received request, without terminating the local server.

According to aspects of the present disclosure, further provided is an information processing device including a processor, and a memory storing processor-executable instructions including an application, a browser, and a local server. The application is configured to, when executed by the processor, cause the processor to accept an authentication instruction to initiate authentication for accessing a cloud server, and in response to accepting the authentication instruction, activate the local server configured to cause the processor to serve as a web server of a local host, and activate the browser, and instruct the browser to display an authentication screen provided by the cloud server and to specify the local server as a redirection destination for a redirection request, the redirection request including authentication information acquired from the cloud server via the authentication screen. The local server is further configured to, when executed by the processor, cause the processor to, in response to receiving a request from the browser after activating the browser, determine whether the received request is a particular request other than the redirection request, when determining that the received request is not the particular request, instruct the browser to display a completion screen including a result of the authentication, and terminate the local server, and when determining that the received request is the particular request, execute an operation responsive to the particular request, without terminating the local server.

According to aspects of the present disclosure, further provided is an information processing device including a processor, and a memory storing processor-executable instructions including an application, a browser, and a local server. The application is configured to, when executed by the processor, cause the processor to accept an authentication instruction to initiate authentication for accessing a cloud server, and in response to accepting the authentication instruction, activate the local server configured to cause the processor to serve as a web server of a local host, and activate the browser, and instruct the browser to display an authentication screen provided by the cloud server and to specify the local server as a redirection destination for a redirection request, the redirection request including authentication information acquired from the cloud server via the authentication screen. The local server is further configured to, when executed by the processor, cause the processor to, in response to receiving the request from the browser after activating the browser, determine whether the received request is the redirection request, when determining that the received request is the redirection request, instruct the browser to display the completion screen including the result of the authentication, and terminate the local server, and when determining that the received request is not the redirection request, execute an operation responsive to the received request, without terminating the local server.

BRIEF DESCRIPTION OF THE ACCOMPANYING DRAWINGS

FIG. 1 is a block diagram schematically showing an electrical configuration of a PC in an illustrative embodiment according to one or more aspects of the present disclosure.

FIG. 2 exemplifies a screen for accepting a selection of a data storage destination, in the illustrative embodiment according to one or more aspects of the present disclosure.

FIG. 3 exemplifies a cloud selecting screen in the illustrative embodiment according to one or more aspects of the present disclosure.

FIG. 4 is a sequence diagram showing an authentication procedure in the illustrative embodiment according to one or more aspects of the present disclosure.

FIG. 5 exemplifies an authentication page as an input screen for accepting authentication request information, in the illustrative embodiment according to one or more aspects of the present disclosure.

FIG. 6 exemplifies a confirmation page as a screen for accepting authorization for authentication, in the illustrative embodiment according to one or more aspects of the present disclosure.

FIG. 7 exemplifies an authentication completion screen representing successful authentication, in the illustrative embodiment according to one or more aspects of the present disclosure.

Figure 10:
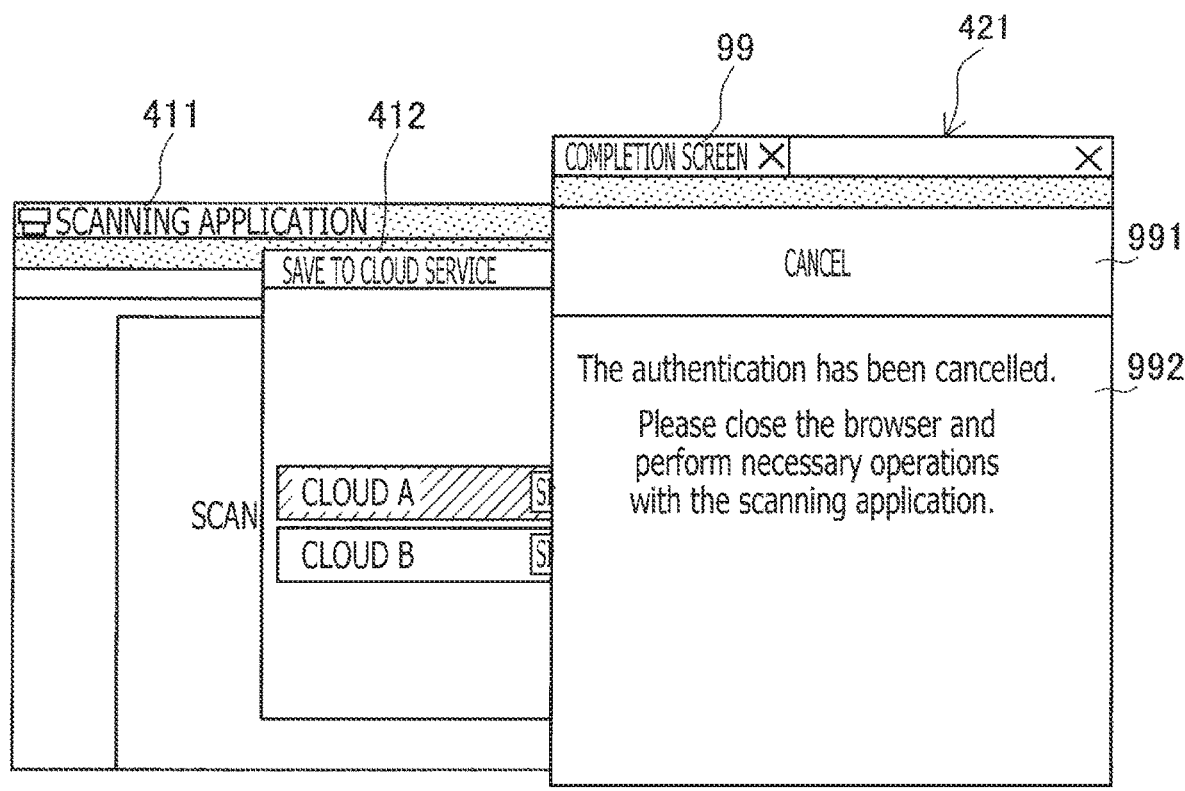

FIG. 10 exemplifies an unsuccessful authentication completion screen representing unsuccessful authentication, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings. In the illustrative embodiment, aspects of the present disclosure are applied to a scanning application program executable by a PC.

Figure 1:
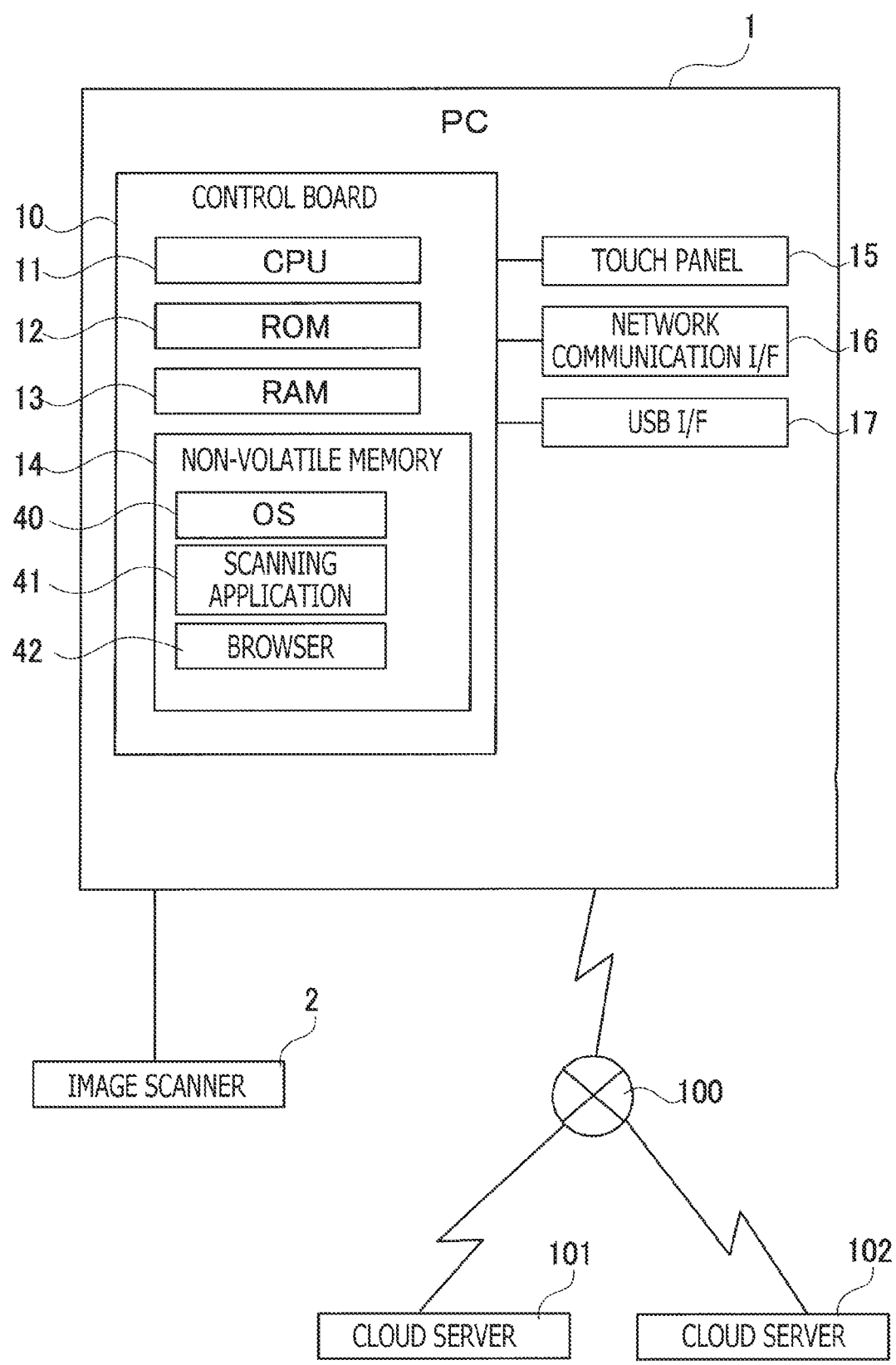

As shown in FIG. 1, in the illustrative embodiment, a PC 1 is connected with an image scanner 2 and may receive image data from the image scanner 2. The PC 1 is configured to execute various programs. For instance, the PC 1 may be replaced with another information processing device such as a tablet computer and a smartphone. The image scanner 2 is configured to scan a document sheet to generate image data representing a scanned image of the document sheet and send the image data to the PC1. Although a single image scanner 2 is connected with the PC 1 in the example shown in FIG. 1, a plurality of image scanners 2 may be connected with the PC 1. Further, what is to be connected with the PC 1 is not limited to the image scanner 2 but may be devices or apparatuses (e.g., copy machines, facsimile machines, and digital cameras) configured to acquire image data and send the acquired image data to the PC 1.

As shown in FIG. 1, in the illustrative embodiment, the PC 1 is connected with an Internet 100 and connected with a cloud server 101 and a cloud server 102 via the Internet 100. Namely, a user of the PC 1 is allowed to use various cloud services provided via the Internet 100.

In each cloud service, one or more storage servers and one or more authentication servers may be managed. Further, each cloud service may offer a service to upload data to a managed storage server and download data from the storage server. At least one storage server may serve as an authentication server. In the following description, one or more storage servers and one or more authentication servers managed in a single cloud service may not separately but collectively be referred to as "cloud servers." In the example shown in FIG. 1, the PC 1 is connected with the two cloud servers 101 and 102. Nonetheless, the number of cloud servers actually connectable with the PC 1 is not limited to two. Namely, the number of cloud servers accessible from the PC 1 may be more than two.

As shown in FIG. 1, in the illustrative embodiment, the PC 1 includes a control board 10, which includes a CPU 11, a ROM 12, a RAM 13, and a non-volatile memory 14. Further, the PC 1 includes a touch panel 15, a network communication I/F ("I/F" is an abbreviation of "interface") 16, and a USB I/F 17 that are electrically connected with the control board 10.

The ROM 12 stores therein programs such as a boot program for booting the PC 1. The RAM 13 is usable as a work area when various kinds of processing are performed or as a storage area to temporarily store data. The non-volatile memory 14 may include at least one of storage devices such as an HDD and a flash memory. The non-volatile memory 14 is usable as a storage area to store various programs, various types of data such as image data, and various settings.

The CPU 11 is configured to perform various kinds of processing in accordance with programs read out of the ROM 12 or the non-volatile memory 14, or based on user instructions. It is noted that the "control board 10" may be a general term for collectively referring to hardware elements and software elements used to control the PC 1. Namely, the control board 10 may not necessarily represent a single hardware element actually existing in the PC 1.

The touch panel 15 is configured to accept therethrough user operations and display thereon information. Namely, the touch panel 15 is a user I/F that doubles as an input device and an output device. The user I/F may not necessarily be limited to the touch panel 15 but may include a combination of a display, a keyboard, and a mouse.

The network communication I/F 16 includes a hardware element configured to communicate with an external device via the Internet 100. A communication system for the network communication I/F 16 may be a wireless system or a wired system, and may comply with any type of communication standards such as standards for LAN and Wi-Fi (registered trademark). Further, the USB I/F 17 includes a hardware element configured to communicate with the image scanner 2. It is noted that there may be an image scanner connected with the PC 1 via the network communication I/F 16.

The non-volatile memory 14 stores therein various programs including but not limited to an OS ("OS" is an abbreviation of "operating system") 40, a scanning application program (hereinafter, which may be simply referred to as a "scanning application") 41, and a browser 42. The scanning application 41 is a program for, based on user instructions, communicating with the image scanner 2, transmitting settings for image scanning and a scanning instruction to the image scanner 2, receiving from the image scanner 2 image data representing an image scanned by the image scanner 2, displaying the image represented by the received image data, and saving the image data. In the illustrative embodiment, the browser 42 is a program, separate from the scanning application 41, for displaying web pages. It is noted that a part of the OS 40 may be stored in the ROM 12.

A storage medium in which the scanning application 41 is stored may not necessarily be limited to the non-volatile memory 14. The scanning application 41 may be stored in any of other non-transitory computer-readable storage media including but not limited to a CD-ROM and a DVD-ROM. The non-transitory computer-readable storage media are tangible media. Meanwhile, electric signals carrying programs downloaded from a server on the Internet may be classified as computer-readable signal media but are not included in the non-transitory computer-readable storage media.

Subsequently, the scanning application 41 will be described. In the following description, processes, operations, and steps of flowcharts may basically represent processing by the CPU 11 in accordance with instructions written in programs such as the scanning application 41. Namely, in the following description, operations such as "determining," "receiving," "acquiring," "accepting," and "controlling" may represent processing by the CPU 11. Processing by the CPU 11 may include hardware control using an interface such as an API ("API" is an abbreviation of "Application Programming Interface") for exchanging data with other modules of the OS 40 of the PC 1. It is noted that, in the present disclosure, processes, operations, and steps of each program may be described without referring to the OS 40. Specifically, for instance, in the following description, a description "a program P controls a hardware element H" may represent that the program P controls the hardware element H with the API of the OS 40. Further, "acquiring" may include a concept of acquiring something with no need to make a request for the something. Specifically, for instance, an operation of the CPU 11 receiving data without making a request for the data may be included in a concept "the CPU 11 acquires the data." Further, "data" referred to in the present disclosure may be expressed as a computer-readable bit string. Further, two pieces of data that have substantially the same contents and have mutually different formats may be treated as the same data. The same applies to "information" referred to in the present disclosure. Further, "requesting" may include a concept of transmitting information indicating what is requested to the other party. Likewise, "instructing" may include a concept of transmitting information indicating what is instructed to do to the other party. Furthermore, information indicating what is requested and information indicating what is instructed to do may be simply referred to as a "request" and an "instruction," respectively.

Further, processing by the CPU 11 in accordance with instructions written in a program may be expressed using simplified or partially-omitted wording. Specifically, for instance, "the CPU 11 executing the scanning application 41 performs something" may be expressed as "the scanning application 41 performs something." Further, a process of the CPU 11 determining whether information A represents occurrence of an event B may be conceptually expressed as "the CPU 11 determines whether an event B is occurring, from information A." Further, a process of the CPU 11 determining whether information A represents occurrence of an event B or represents occurrence of an event C may be conceptually expressed as "the CPU 11 determines whether an event B is occurring or an event C is occurring, from information A."

In the illustrative embodiment, after receipt of an instruction to launch the scanning application 41, the scanning application 41 causes the touch panel 15 to display thereon a window to accept a user operation. For instance, based on a user instruction accepted via the window, the scanning application 41 causes the image scanner 2 to scan an image of a document sheet, receives image data of the scanned image from the image scanner 2, and stores the received image data into a specified storage location. Hereinafter, referring to FIGS. 2 to 7, a procedure to upload the image data to a cloud server will be described.

Figure 2:
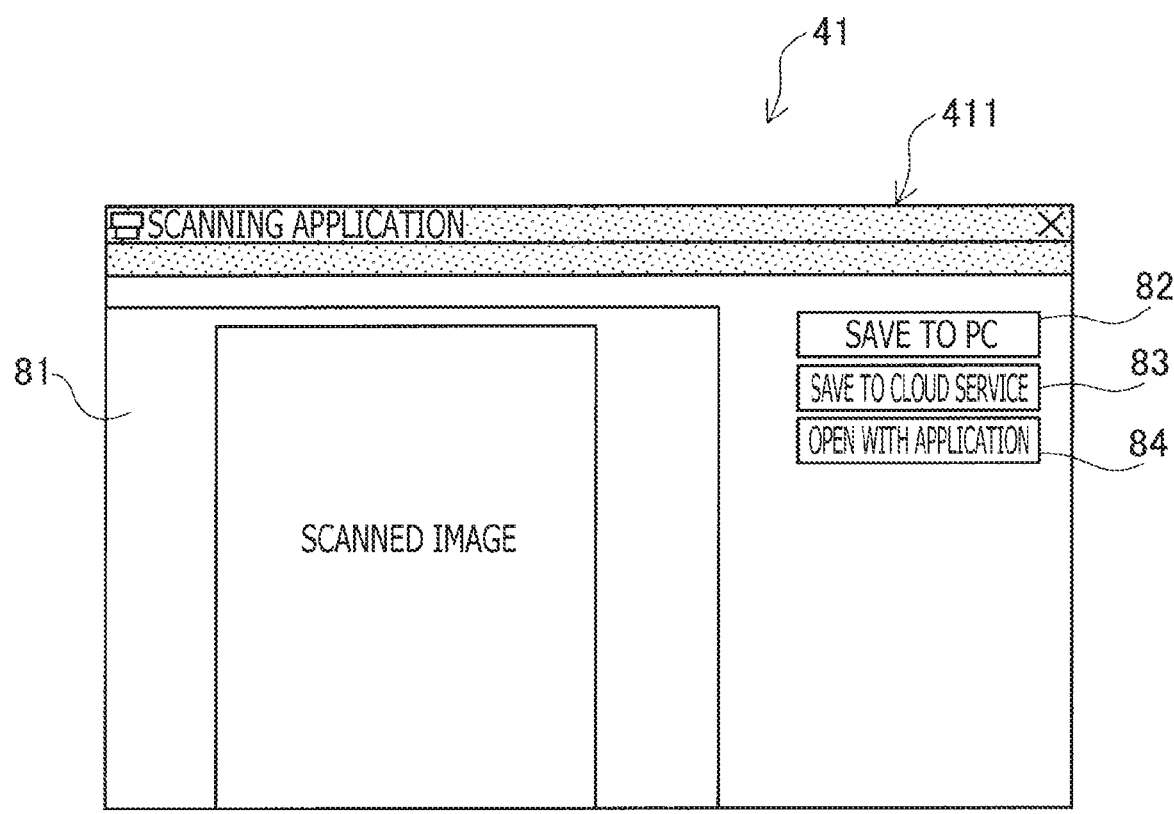

FIG. 2 shows an example of a primary window 411 displayed on the touch panel 15 by the scanning application 41 in response to receipt of an instruction to store the image data. In the example shown in FIG. 2, the primary window 411 has a scanned image area 81 in which an image based on the image data received from the image scanner 2 is displayed. Further, the primary window 411 includes a "Save into PC" button 82, a "Save to Cloud Service" button 83, and an "Open with Application" button 84, as selectable options for data storage destinations. Then, the scanning application 41 accepts a user operation to select one of the buttons 82 to 84.

Figure 3:
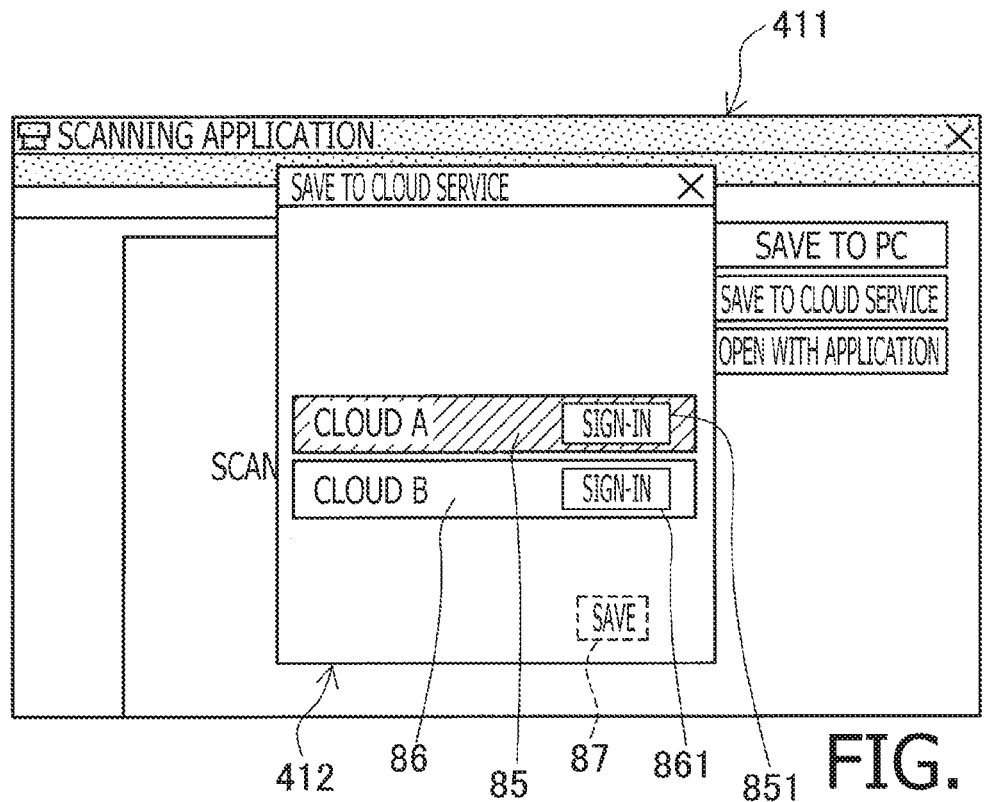

In response to accepting a user operation to select the button 83, the scanning application 41 causes the touch panel 15 to display a cloud selecting window 412 for accepting a selection of a cloud server as a data upload destination. FIG. 3 shows an example of the cloud selecting window 412. The cloud selecting window 412 is displayed on the front of the primary window 411.

In the example shown in FIG. 3, the cloud selecting window 412 includes a "Cloud A" button 85 and a "Cloud B" button 86, and the "Cloud A" button 85 is selected. Each cloud server has a separate management system. Therefore, in an attempt to upload the image data to the selected cloud server (hereinafter, which may be referred to as a "specific cloud server"), the scanning application 41 needs to take authentication based on regulations for the selected cloud server and acquire authentication information. As shown in FIG. 3, the cloud selecting window 412 includes "Sign-in" buttons 851 and 861 each of which is for a corresponding one of the cloud servers.

For instance, when accepting, via the cloud selecting window 412, a user operation to the button 85 for selecting the specific cloud server and a user operation to the button 851 for providing a sign-in instruction to initiate authentication for signing in to the specific cloud server, the scanning application 41 starts a procedure to acquire the authentication information. It is noted that the button 851 functions as an operable member configured to, when operated, accept the sign-in instruction, and also functions as an indicator configured to indicate a sign-out state where the user is not signing in to the specific cloud server. After completion of signing in to the specific cloud server, the scanning application 41 causes the touch panel 15 to display a button for accepting a sign-out instruction for signing out from the specific cloud server or an icon representing sign-out, instead of the button 851. The button for accepting the sign-out instruction also functions as an indicator for indicting a sign-in state where the user is signing in to the specific cloud server.

Figure 4:
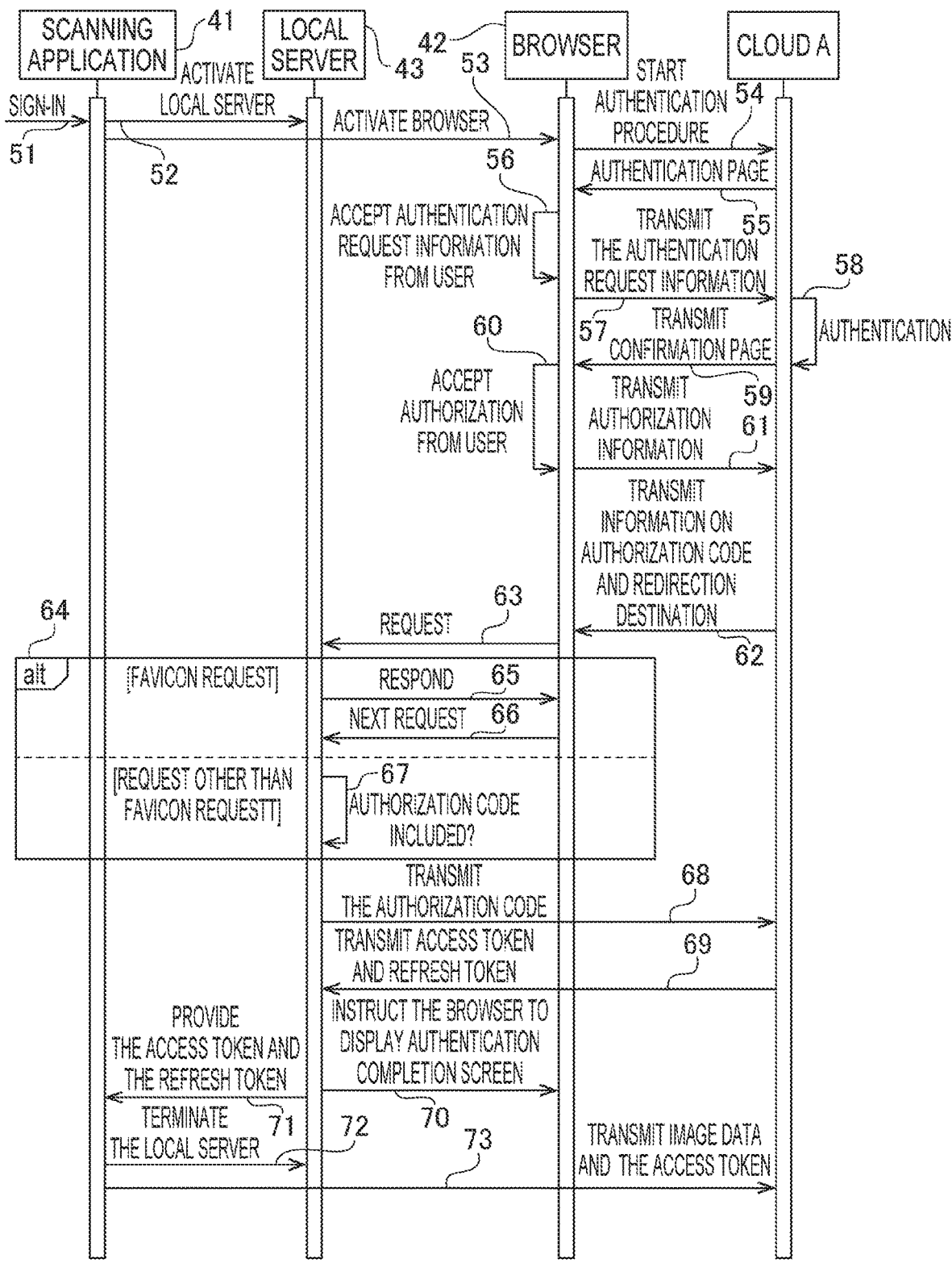

For instance, an authentication method using OAuth 2.0 is employed for the specific cloud server. In the authentication method using OAuth 2.0, for instance, an access token as authentication information is acquired in a procedure shown in a sequence diagram of FIG. 4. FIG. 4 shows a procedure (i.e., a sequence of processes 51 to 73) for a user, who has already created an account for signing in to the specific cloud server, to be successfully authenticated to access the specific cloud server. It is noted that a cloud A is a program to be executed by the specific cloud server.

When accepting a user operation to the button 851 shown in FIG. 3, the scanning application 41 starts a sign-in process for signing in to the cloud A, as shown in FIG. 4. In response to accepting a sign-in instruction (Process 51), the scanning application 41 first activates a local server 43 (Process 52), and further activates the browser 42 (Process 53).

The local server 43 is a program for causing the PC 1 to serve as a web server of a local host. The web server of the local host is configured to function inside a device on which the web server is operating, and is set available to clients. Namely, the local server 43 may perform HTTP communication with the browser 42 inside the PC 1 in substantially the same manner as a web server publicly available on the Internet 100 performs HTTP communication with the browser 42. In the illustrative embodiment, the local server 43 is included in the scanning application 41. In other words, the local server 43 is stored in the non-volatile memory 14 as a part of the scanning application 41. Nonetheless, the local server 43 may be configured as a program separate from the scanning application 41.

In the process 53 of FIG. 4, the scanning application 41 specifies, for the browser 42, a URL of an authentication page of the specific cloud server as an access destination and a URL of the local server 43 as a redirection destination. A URL of an authentication page of each selectable cloud server is previously registered in the scanning application 41. The scanning application 41 reads out the URL of the authentication page of the selected cloud server (i.e., the specific cloud server) and sets the read URL as a boot option for the browser 42.

In response to the browser 42 being activated in the process 53 of FIG. 4, the browser 42 transmits, to the cloud A, a request to start an authentication procedure (Process 54), and receives web page data of the authentication page from the cloud A (Process 55). It is noted that hereinafter, web page data may be simply referred to as a "page." For instance, as shown in FIG. 5, the browser 42 causes the touch panel 15 to display a browser display screen 421 including the authentication page of the cloud A.

It is noted that the specific cloud server may provide a service to display information registered in an application program as a transmission source of the information. For instance, when a maker of the scanning application 41 has previously requested a service provider of the specific cloud server to register registration information (e.g., a name and an icon of the scanning application 41) as registered in the scanning application 41 in association with identification information of the scanning application 41, the service provider registers the registration information in the specific cloud server. In response to receiving the identification information of the scanning application 41 when the authentication procedure is started, the specific cloud server transmits, to the browser 42, the web page data including the registration information associated with the received identification information. Thereby, as shown in FIG. 5, information (e.g., the name and the icon 91 of the scanning application 41) regarding the scanning application 41 is displayed on the authentication page.

Figure 5:
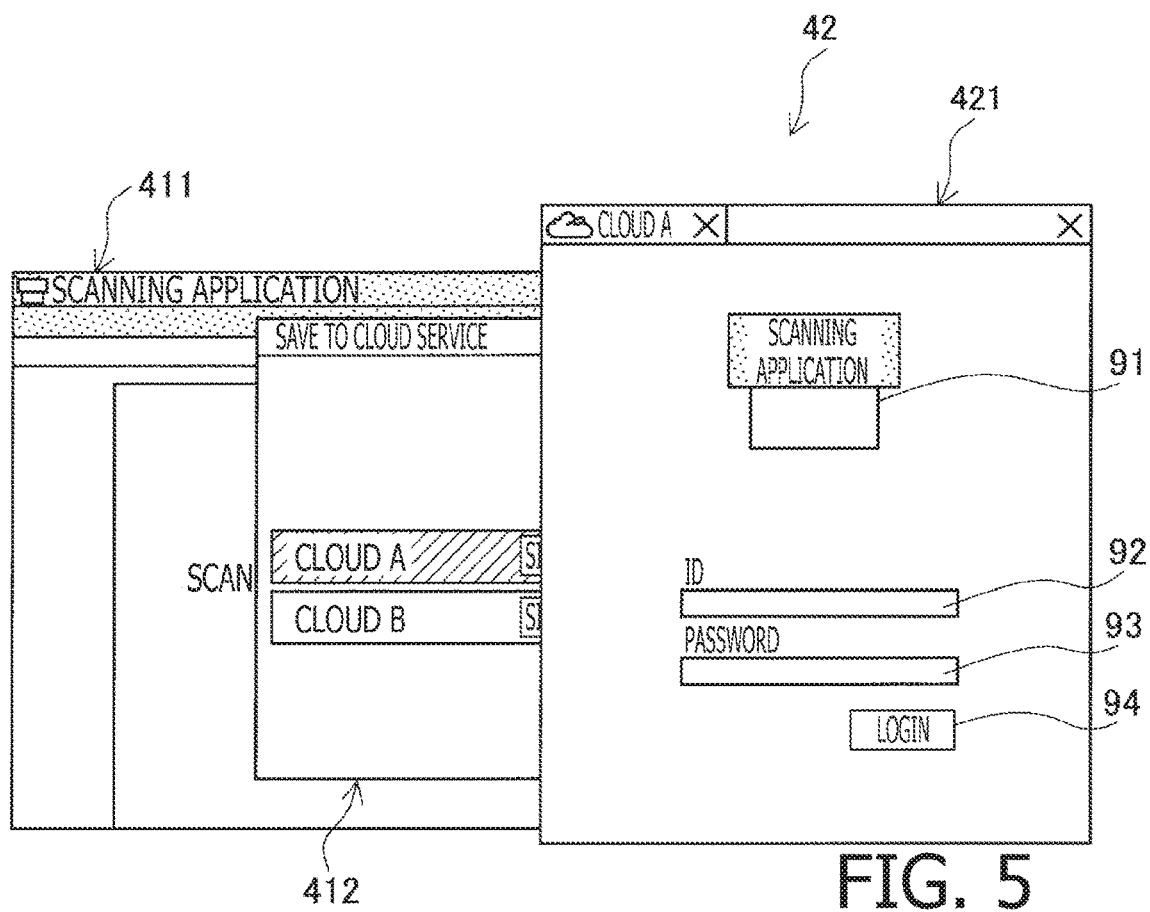

As shown in FIG. 5, for instance, an ID entry field 92, a password entry field 93, and a login button 94 are displayed on the authentication page of the cloud A. As shown in FIG. 4, the browser 42 accepts a user operation to input authentication request information via the authentication page being displayed (Process 56). For instance, the authentication request information may contain a combination of an ID, a mail address, and a password. Namely, the authentication request information is information on the account as previously registered in the cloud A by the user. Further, in response to accepting a user operation to the login button 94 (see FIG. 5) in a state where the authentication request information has been input, as shown in FIG. 4, the browser 42 transmits the authentication request information to the cloud A, thereby making a request for authentication (Process 57).

It is noted that the authentication page may include a button for creating an account. For instance, once operating this button, a user who has not yet created an account may move on to a page for creating an account from the authentication page, and after creating the account, may cause the cloud A to perform an authentication process. Further, the browser 42 may have a cache function. Namely, the browser 42 may cache information on IDs and passwords as input in the past. Referring to cache information, the browser 42 may display initial information in each of the ID entry field 92 and the password entry field 93. Namely, when the browser 42 has the cache information, the browser 42 may accept a user operation to the login button 94 in the process 57 (see FIG. 4) with no need to accept a user operation to input the authentication request information in the process 56.

Figure 6:
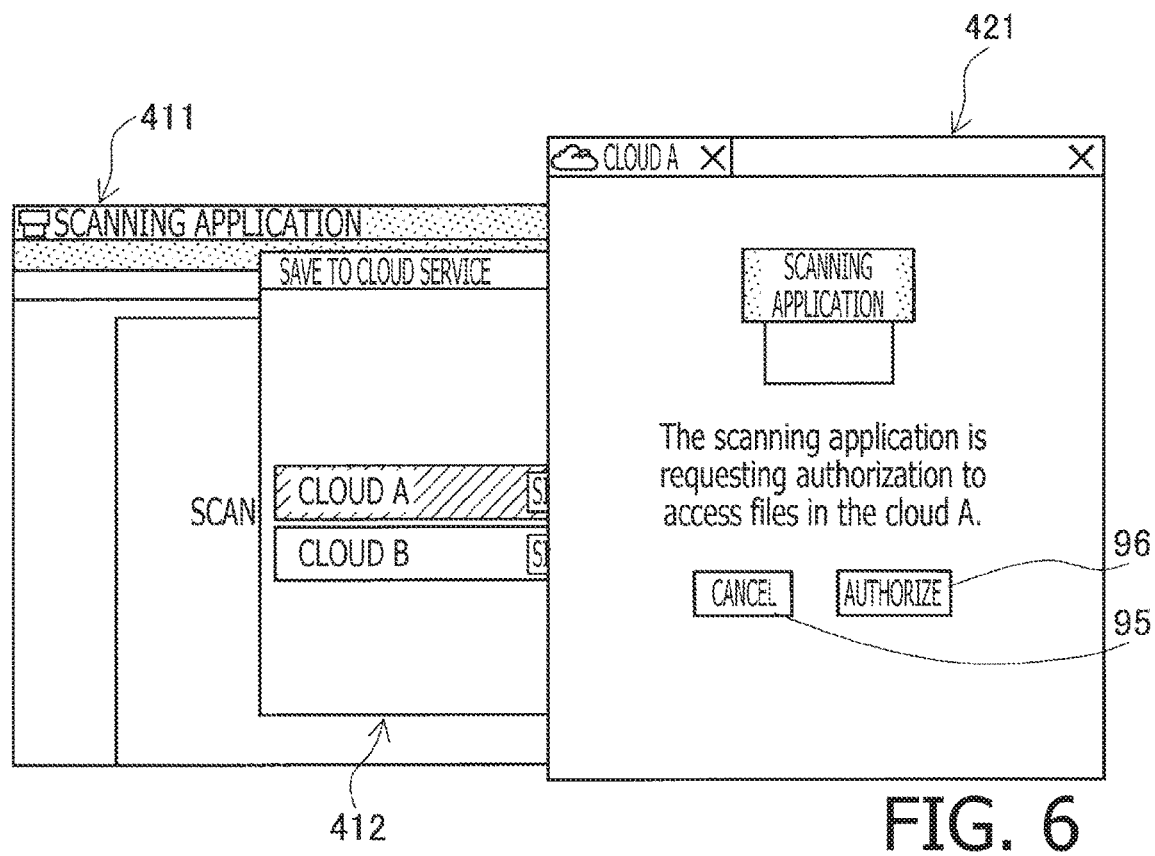

The cloud A performs an authentication process based on the authentication request information (Process 58). When the user has been successfully authenticated in the authentication process, the cloud A transmits a confirmation page to the browser 42 (Process 59). FIG. 6 shows an example of the confirmation page. In response to receiving the confirmation page, the browser 42 displays the confirmation page on the browser display screen 421. As shown in FIG. 6, the confirmation page includes a cancel button 95, an authorization button 96, and a character string representing that the authentication process will be normally completed by operating the authorization button 96. Then, the browser 42 accepts a user operation to one of the buttons 95 and 96.

As shown in FIG. 4, in response to accepting a user operation to the authorization button 96 (Process 60), the browser 42 transmits authorization information to the cloud A (Process 61). In response to receiving the authorization information, the cloud A transmits information on an authorization code and a redirection destination to the browser 42 (Process 62). The information on the redirection destination as transmitted in the process 62 may include the URL of the local server 43 as specified in the process 53.

Based on the information received from the cloud A, the browser 42 makes a redirection to the URL of the local server 43. Specifically, the browser 42 transmits to the local server 43 a redirection request for requesting the local server 43 to transmit information on a web page to display. At this time, the browser 42 transmits, to the local server 43, the redirection request along with the information received from the cloud A (Process 63). For instance, the information transmitted to the local server 43 in the process 63 may include the authorization code of the cloud A.

Nonetheless, while waiting for an authentication result, the local server 43 may receive a request different from the redirection request prior to receiving the redirection request in the process 63, depending on a type of the browser 42 and a sequence of the processes. For instance, a specific type of browser 42 may make a request for not only the information on the web page but also information on a favicon when transmitting the redirection request to the local server 43. The favicon is an abbreviation of "favorite icon" and is an icon representing a symbol mark of a website. For instance, the browser 42 may display a favicon on a tab or a bookmark. Further, for instance, the browser 42 may transmit a favicon request for requesting the local server 43 to transmit the information on the favicon, prior to or at the same time as transmitting the redirection request. If the local server 43 receives the favicon request prior to receiving the redirection request in the process 63, the local server 43 might mistakenly recognize the favicon request as the redirection request and thereby erroneously recognize the authentication result.

In the illustrative embodiment, as shown in FIG. 4, when receiving a request from the browser 42 in the process 63, the local server 43 determines whether the received request is the favicon request (Process 64). Specifically, in the process 64, the local server 43 determines whether the received request includes character string data representing that the received request is the favicon request. When determining that the received request is the favicon request, the local server 43 transmits data of the favicon to the browser 42 (Process 65). Further, the local server 43 receives a next request from the browser 42 (Process 66).

Meanwhile, when determining that the received request is not the favicon request, the local server 43 determines that the received request is the redirection request. When receiving the next request in the process 66 after transmitting the data of the favicon in response to determining that the request received in the process 63 is the favicon request, the local server 43 determines that the next request received in the process 66 is the redirection request. Then, as shown in FIG. 4, the local server 43 determines whether the redirection request includes the authorization code (Process 67).

As shown in FIG. 4, when determining that the redirection request includes the authorization code, the local server 43 transmits the received authorization code to the cloud A (Process 68). In response to receiving the authorization code, the cloud A transmits a combination of an access token and a refresh token to the local server 43 that is a transmitting source of the authorization code (Process 69). Thus, the authentication procedure for signing in to the cloud A is completed. The local server 43, which has received the combination of the access token and the refresh token, determines that the authentication was successful.

The local server 43 provides the browser 42 with a page showing the authentication result and instructs the browser 42 to display the page (Process 70). At this time, the browser 42 is brought into an active state, and for instance, as exemplified in FIG. 7, may display an authentication completion screen 98 showing the authentication result on the browser display screen 421. The authentication completion screen 98 (see FIG. 7) is a web page to be displayed by the browser 42 when the user has been successfully authenticated to access the cloud A. The authentication completion screen 98 is for notifying the user of completion of the authentication procedure.

Figure 7:
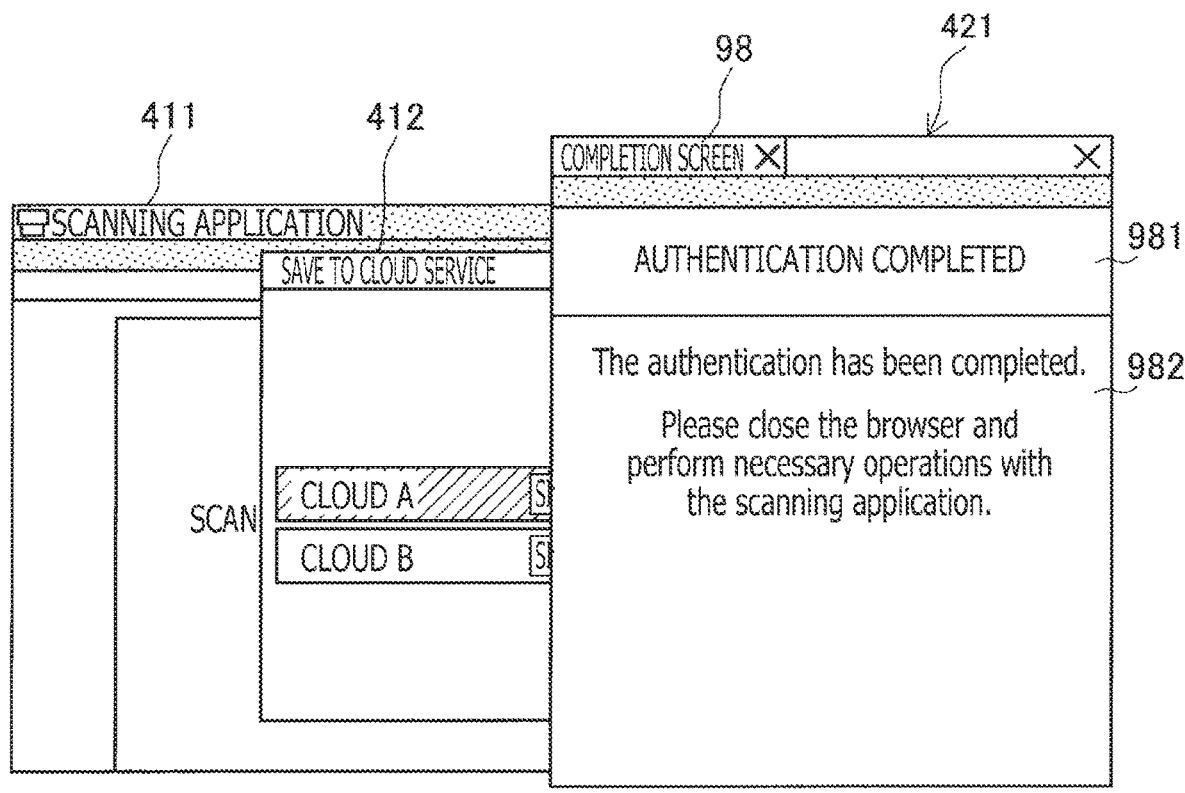

As shown in FIG. 7, for instance, the authentication completion screen 98 includes authentication completion information 981 for notifying the user of completion of the authentication procedure and information 982 for prompting the user to activate the window of the scanning application 41. In the process 70, the browser 42 is brought into the active state. Hence, at this time, the scanning application 41 is in an inactive state. Therefore, in order to continue to operate the scanning application 41, the scanning application 41 needs to be activated. In the illustrative embodiment, since the authentication completion screen 98 includes the information 982, it is possible to prompt the user to activate the scanning application 41.

Further, as shown in FIG. 4, the local server 43 provides the scanning application 41 with the received combination of the access token and the refresh token (Process 71). After receiving the combination of the access token and the refresh token, the scanning application 41 terminates the local server 43 (Process 72).

For instance, when activated by a user operation, the scanning application 41 accepts a user operation to a save button 87 as shown in FIG. 3. In response to accepting the user operation to the save button 87, the scanning application 41 transmits image data with the access token attached thereto (Process 73). Thereby, the image data is stored into a storage server of the cloud A.

Figure 8:
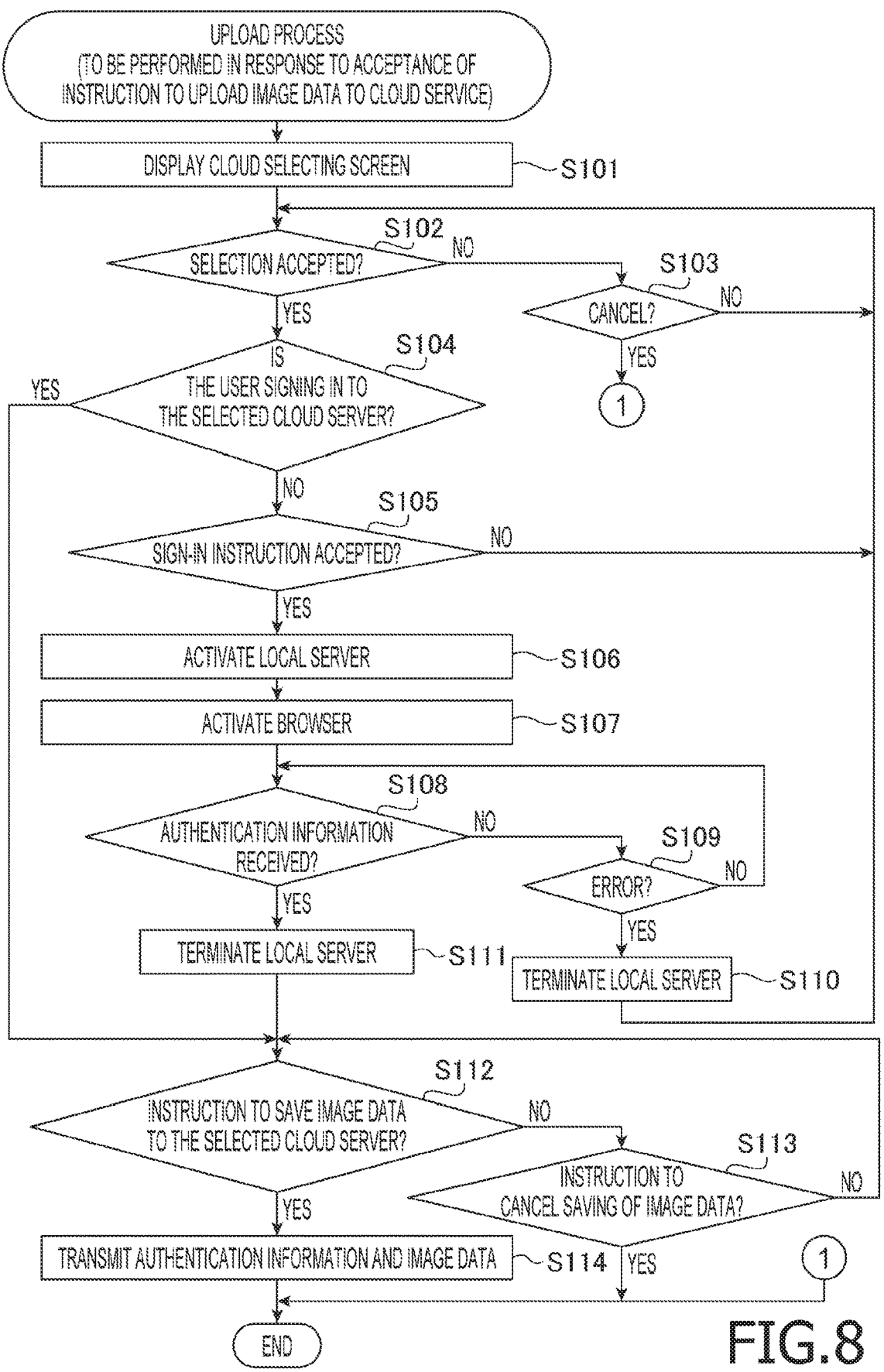
FIG. 8 is a flowchart showing a procedure of an upload process in the illustrative embodiment according to one or more aspects of the present disclosure.

Subsequently, referring to FIG. 8, an explanation will be provided of an upload process to be performed by the scanning application 41 (more specifically, by the CPU 11 executing the scanning application 41). The upload process is performed by the CPU 11 in response to the scanning application 41 being launched by the PC 1 and then accepting an instruction to upload image data to a cloud server. For instance, the upload process may be performed when the "Save to Cloud Service" button 83 is selected in the state shown in FIG. 2. In this case, the scanning application 41 may have acquired the image data to be uploaded, by the time of starting the upload process.

In the upload process, the CPU 11 causes the touch panel 15 to display the cloud selecting window 412 (see FIG. 3) in an active state (S101). In the illustrative embodiment, the scanning application 41 is configured to allow the user to select an upload destination from among a plurality of cloud servers and to determine a cloud server selected by the user, as the upload destination.

Then, the CPU 11 determines whether the CPU 11 has accepted a selection of a cloud server via the cloud selecting window 412 (S102). When determining that the CPU 11 has not accepted a selection of a cloud server (S102: No), the CPU 11 determines whether the CPU 11 has accepted a cancel instruction (S103). When determining that the CPU 11 has not accepted a cancel instruction (S103: No), the CPU 11 waits until the CPU accepts a selection of a cloud server or a cancel instruction.

When determining that the CPU 11 has accepted a selection of a cloud server (S102: Yes), the CPU 11 determines whether the user is signing in to the selected cloud server (S104). When determining that the user is not signing in to the selected cloud server (S104: No), the CPU 11 determines whether the CPU 11 has accepted a sign-in instruction to initiate authentication for signing in to the selected cloud server, via the touch panel 15 (S105). As described above, the sign-in instruction may be accepted in response to a user operation to a button (e.g., the button 851 in FIG. 3) displayed on the cloud selecting window 412 in the active state.

When determining that the CPU 11 has not accepted a sign-in instruction via the touch panel 15 (S105: No), the CPU 11 goes back to S102 and waits for a selection of a cloud server, a cancel instruction, or a sign-in instruction from the user.

Meanwhile, when determining that the CPU 11 has accepted a sign-in instruction via the touch panel 15 (S105: Yes), the CPU 11 activates the local server 43 (S106) (Process 52 in FIG. 4). Further, the CPU 11 activates the browser 42 (Process 53 in FIG. 4), and instructs the browser 42 to specify the local server 43 activated in S106 as a redirection destination and display an authentication screen provided by the selected cloud server (S107).

In response to the instruction provided in S107, for instance, as exemplified in FIGS. 5 and 6, the browser display screen 421 of the browser 42 is displayed in the active state, on the touch panel 15. Therefore, the display screens (e.g., the primary window 411 and the cloud selecting window 412) of the scanning application 41 are brought into the inactive state. Specifically, for instance, the browser display screen 421 may be displayed in a forefront on the touch panel 15. In this case, when the browser display screen 421 is placed to overlap the primary window 411 or the cloud selecting window 412 of the scanning application 41, at least a part of the primary window 411 or the cloud selecting window 412 may be displayed to be invisible to the user.

It is noted that for instance, an inactive window may be brought into the active state by the OS 40, in response to a user operation (e.g., clicking or touching the inactive window) for changing the inactive state of the window to the active state. Further, it is noted that "a particular window is in the active state" denotes that the particular window is in a state where user operations, other than the user operation for changing the inactive state of the particular window to the active state, are acceptable via the particular window. Examples of the user operations other than the user operation for changing the inactive state of the particular window to the active state may include operating a button, inputting characters, and moving a cursor, on the particular window. It is noted that clicking or touching a button included in the inactive particular window may double as the aforementioned user operation of operating a button on the particular window and the aforementioned user operation for changing the inactive state of the particular window to the active state. In the system of the illustrative embodiment, only a single program is allowed to be in the active state. Namely, in the illustrative embodiment, the system as exemplified in FIG. 1 may be controlled by the OS 40 in such a manner that a program is brought into the active state while the other programs are set to be inactive.

After S107, the CPU 11 determines whether the CPU 11 has received authentication information via the local server 43 (i.e., whether the scanning application 41 has received authentication information from the local server 43) (S108). The authentication information may be the aforementioned combination of the access token and the refresh token, or a single token or a single authentication key. When determining that the CPU 11 has not received authentication information (S108: No), the CPU 11 determines whether the CPU 11 has received error information (S109).

For instance, when an error has occurred in the authentication procedure for signing in to the cloud A, or a user operation to the cancel button 95 has been accepted on the confirmation page shown in FIG. 6, the cloud A does not transmit the authorization code to the browser 42. In this case, the browser 42 receives error information or cancellation information from the cloud A in the process 62 of FIG. 4. Then, the local server 43 determines that information received from the browser 42 does not include the authorization code, in the process 67 of FIG. 4. Therefore, the local server 43 does not perform the process 68 of FIG. 4, and it results in unsuccessful authentication. In this case, the scanning application 41 receives, from the local server 43, error information representing the unsuccessful authentication.

When determining that the CPU 11 has not received the error information (S109: No), the CPU 11 goes back to S108 and waits until the CPU 11 receives the authentication information or the error information. Then, when determining that the CPU 11 has received the error information (S109: Yes), the CPU 11 terminates the local server 43 (S110). Afterward, the CPU 11 goes back to S102 and waits for a selection of a cloud server, a cancel instruction, or a sign-in instruction from the user.

When determining that the CPU 11 has received the authentication information (S108: Yes) (Process 71 in FIG. 4), the CPU 11 terminates the local server 43 (S111) (Process 72 in FIG. 4). It is noted that the CPU 11 may cause the local server 43 to terminate the local server 43 (i.e., the local server 43 may be self-terminated). In this case, the steps S110 and S111 are unnecessary.

After S111, or when determining that the user is already signing in to the selected cloud server (S104: Yes), the CPU 11 determines whether the CPU 11 has accepted an instruction to save the image data to the selected cloud server (S112).

When the user is signing in to the selected cloud server, the scanning application 41 causes the cloud selecting window 412 to display the save button 87, as shown in FIG. 3. Then, the CPU 11 accepts a user operation to the save button 87 in a state where the scanning application 41 is active. Nonetheless, as described above, the browser 42 is brought into the active state in S107, and remains active even after the local server 43 is terminated, as long as the scanning application 41 does not accept a further user operation. In the illustrative embodiment, the authentication completion screen 98 (see FIG. 7) includes the information 982, thereby prompting the user to perform a user operation to activate the scanning application 41.

Further, the scanning application 41 does not need to determine whether the scanning application 41 is in the active state, in advance of accepting a user operation to the save button 87. For instance, as described above, when a user operation of clicking or touching the save button 87 also serves as providing an instruction to activate the scanning application 41, the scanning application 41 may accept a user application to the save button 87, regardless of whether the scanning application 41 is in the active state.

When determining that the CPU 11 has not accepted an instruction to save the image data to the selected cloud server (S112: No), the CPU 11 determines whether the CPU 11 has accepted an instruction to cancel saving of the image data to the selected cloud server (S113). When determining that the CPU 11 has accepted an instruction to cancel saving of the image data to the selected cloud server (S113: No), the CPU 11 goes back to S112 and waits until the CPU 11 accepts an instruction to save the image data or an instruction to cancel saving of the image data.

When determining that the CPU 11 ha accepted an instruction to save the image data to the selected cloud server (S112: Yes), the CPU 11 transmits, to the selected cloud server, the image data with the authentication information received in S108 (S114) (Process 73 in FIG. 4). Then, after S114, or when determining that the CPU 11 has accepted an instruction to cancel saving of the image data to the selected cloud server (S113: Yes), the CPU 11 terminates the upload process.

Figure 9:
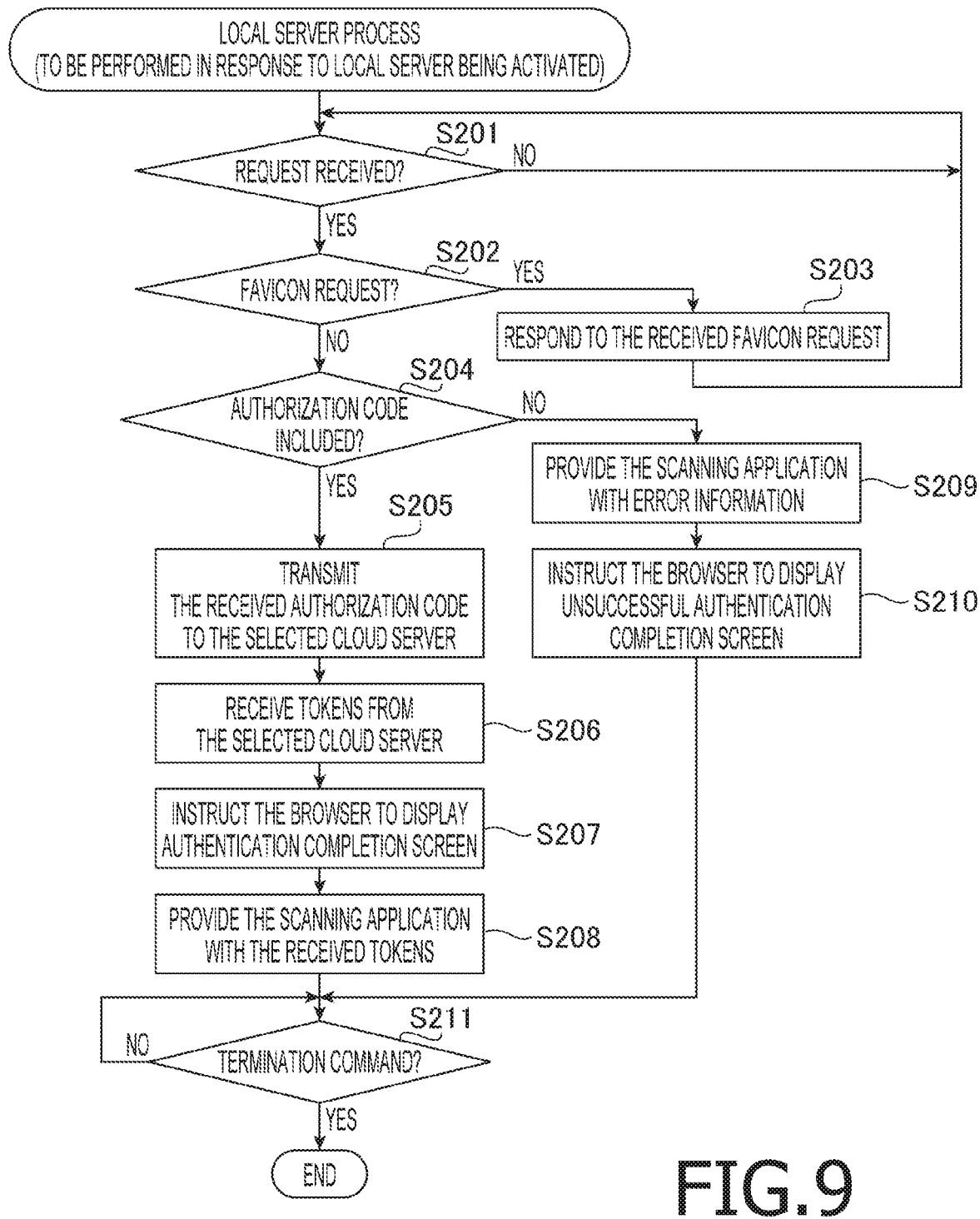
FIG. 9 is a flowchart showing a procedure of a local server process in the illustrative embodiment according to one or more aspects of the present disclosure.

Subsequently, referring to FIG. 9, an explanation will be provided of a local server process, which is a process by the local server 43 activated in S106 of the upload process. The local server process is performed by the CPU 11 of the PC 1 in response to the local server 43 being activated.

In the local server process, the CPU 11 determines whether the CPU 11 has received a request via the browser 42 (i.e., whether the local server 43 has received a request from the browser 42) (S201). When determining that the CPU 11 has not received a request (S201: No), the CPU 11 waits until the CPU 11 receives a request.

When determining that the CPU 11 has received a request (S201: No) (Process 63 or 66 in FIG. 4), the CPU 11 determines whether the received request is the favicon request (S202) (Process 64 in FIG. 4). When determining that the received request is the favicon request (S202: Yes), the CPU 11 executes an operation responsive to the favicon request (S203) (Process 65 in FIG. 4). Then, the CPU 11 goes back to S201 and waits until the CPU 11 receives a further request.

In the illustrative embodiment, when determining that the request received from the browser 42 is the favicon request, the local server 43 does not perform a process for responding to the redirection request. Therefore, the local server 43 keeps waiting for the redirection request, without being terminated. Thus, it is possible to reduce a potential risk that such erroneous recognition might be made that the user has not been successfully authenticated to access the selected cloud server. Namely, in the illustrative embodiment, the local server 43 is more likely to, when receiving another request, safely receive the redirection request.

It is noted that the favicon is not displayed in a display area of a web page being displayed and that the web page is not changed even after the favicon has been displayed. Namely, when the local server 43 transmits the data of the favicon to the browser 42, the contents of the web page which is being displayed for the authentication by the browser 42 is not changed. Thus, the transmission of the data of the favicon does not adversely affect the authentication procedure. Therefore, the local server 43 may respond to the favicon request. Meanwhile, the local server 43 is preferred not to respond to such a request as to cause a change in the contents of the web page. It is noted that in S203, the CPU 11 may respond the favicon request in such a manner as not to display the requested favicon.

When determining that the received request is not the favicon request (S202: No), the CPU 11 determines whether the received request includes the authorization code (S204). When determining that the received request includes the authorization code (S204: Yes), the CPU 11 transmits the received authorization code to the selected cloud server (S205) (Process 68 in FIG. 4). Then, the CPU 11 receives a combination of the access token and the refresh token from the selected cloud server (S206) (Process 69 in FIG. 4).

Further, the CPU 11 instructs the browser 42 to display a completion screen representing that the user has been successfully authenticated to access the selected cloud server (S207) (Process 70 in FIG. 4). In S207, for instance, the CPU 11 may provide the browser 42 with web page data of the authentication completion screen 98 (see FIG. 7) as the completion screen representing the successful authentication. Further, the CPU 11 provides the scanning application 41 with the received combination of the access token and the refresh token (S208) (Process 71 in FIG. 4).

When determining that the received request does not include the authorization code (S204: No), the CPU 11 provides the scanning application 41 with error information representing that the user has been unsuccessfully authenticated (S209). When the received request is not the favicon request, and the CPU 11 has failed to receive the authorization code, the CPU 11 instructs the browser 42 to display a completion screen representing that the user has been unsuccessfully authenticated (S210). In S210, for instance, as exemplified in FIG. 10, the CPU 11 may provide the browser 42 with web page data of an unsuccessful authentication completion screen 99 to be displayed when the authentication is cancelled.

The unsuccessful authentication completion screen 99 is a web page to be displayed by the browser 42 when the user has been unsuccessfully authenticated. Namely, the unsuccessful authentication completion screen 99 is a completion screen for notifying the user that the user has been unsuccessfully authenticated. FIG. 10 exemplifies the unsuccessful authentication completion screen 99 displayed, for instance, when a user operation to the cancel button 95 has been accepted via the confirmation page (see FIG. 6). As shown in FIG. 10, the unsuccessful authentication completion screen 99 includes information 991 representing that the authentication has been cancelled, and information 992 for prompting the user to activate the display screen of the scanning application 41.

When instructing the browser 42 to display the completion screen in S207 or S210, the browser 42 is brought into the active state, while the scanning application 41 is brought into the inactive state. Thus, the completion screen is displayed in the forefront on the touch panel 15, thereby notifying the user whether or not the user has been successfully authenticated. In the meanwhile, in order to perform subsequent operations via the scanning application 41, the user is required to activate the scanning application 41 by a user operation. In the illustrative embodiment, the completion screen, such as the authentication completion screen 98 (see FIG. 7) and the unsuccessful authentication completion screen 99 (see FIG. 10), includes the information 982 or 992 for prompting the user to activate the scanning application 41. Hence, the user may easily recognize that the user is required to activate the scanning application 41. Thus, it is possible to prevent the user from being confused after the user has been successfully or unsuccessfully authenticated.

Then, the CPU 11 determines whether the CPU 11 has received a termination command to terminate the local server 43 (S211). When determining that the CPU 11 has not received a termination command (S211: No), the CPU 11 waits until the CPU 11 receives a termination command. When determining that the CPU 11 has received a termination command (S211: Yes), the CPU 11 terminates the local server process and the local server 43. It is noted that the local server 43 may terminate the local server 43 when failing to receive the redirection request even after a particular period of time has elapsed since the local server 43 was activated.

As described above, in the illustrative embodiment, in response to accepting the sign-in instruction, the scanning application 41 activates the local server 43. The local server 43 may rarely receive, from the browser 42, a particular request other than the redirection request, prior to receiving the redirection request. For instance, in an attempt to transmit the redirection request to the local server 43, a specific type of browser 42 may transmit, to the local server 43, the favicon request as well as the redirection request. In this case, the local server 43 may receive the favicon request prior to receiving the redirection request. In the illustrative embodiment, the local server 43 determines whether the received request is the favicon request. Therefore, it is possible to avoid erroneously recognizing the favicon request as the redirection request. Further, when receiving the favicon request, the local server 43 responds to the favicon request without being terminated. Accordingly, the local server 43 is allowed to keep waiting for the redirection request. Thus, it is possible to reduce a potential risk that a result of the authentication might be erroneously recognized in the attempt to access the selected cloud server.

Hereinabove, the illustrative embodiment according to aspects of the present disclosure has been described. The present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, the following modifications according to aspects of the present disclosure are feasible.

The device connected with the PC 1 is not limited to the image scanner 2 to acquire image data, but may be a device such as a printer to perform printing based on image data. Namely, aspects of the present disclosure may be applied not only to an application program for uploading image data to a cloud server but also to an application program for downloading image data from a cloud server.

Further, for instance, the particular request other than the redirection request is not limited to the favicon request, but may be any request other than the redirection request. Further, for instance, when it is determined whether the received request is the redirection request, a request other than the redirection request may be determined to be the particular request.

Further, the local server 43 may receive the favicon request after receiving the redirection request. For instance, the local server 43 may respond to the favicon request in response to receiving the favicon request during a period of time from when having received the authorization code until when transmitting the received authorization code to the selected cloud server or during a period of time from when having transmitted the authorization code to the selected cloud server until when receiving a token.

In the aforementioned illustrative embodiment, the completion screen, such as the authentication completion screen 98 (see FIG. 7) and the unsuccessful authentication completion screen 99 (see FIG. 10), includes the information 982 or 992 for prompting the user to activate the scanning application 41. Nonetheless, the scanning application 41 may be automatically brought into the active state after the completion screen is displayed. For instance, after the local server 43 is terminated in S110 or S111 in the upload process, the scanning application 41 may provide the OS 40 with an instruction to activate the scanning application 41.

Further, for instance, the authentication method is not limited to an authentication method using OAuth 2.0. The scanning application 41 may make a request for the authentication, based on an authentication method employed by the selected cloud server.

Further, each process as exemplified in the aforementioned illustrative embodiment may be performed by one or more CPUs, one or more hardware elements such as ASICs, or a combination including at least two of one or more CPUs and one or more hardware elements such as ASICs. Further, one or more aspects of the present disclosure may be achieved as a non-transitory computer-readable medium storing computer-executable instructions that cause a processor to perform processes as exemplified in the aforementioned illustrative embodiment. Moreover, one or more aspects of the present disclosure may be achieved as a method implementable on a processor to perform processes as exemplified in the aforementioned illustrative embodiment.

Associations between elements exemplified in the aforementioned illustrative embodiments and elements according to aspects of the present disclosure will be exemplified below. The PC 1 may be an example of an "information processing device" according to aspects of the present disclosure. The CPU 11 of the PC 1 may be an example of a "processor" of the "information processing device" according to aspects of the present disclosure. The non-volatile memory 14 of the PC 1 may be an example of a "non-transitory computer-readable medium" according to aspects of the present disclosure. The non-volatile memory 14 may be an example of a "memory" of the "information processing device" according to aspects of the present disclosure. The touch panel 15 of the PC 1 may be an example of a "user interface" of the "information processing device" according to aspects of the present disclosure. The scanning application 41 may be an example of an "application" according to aspects of the present disclosure. The browser 42 may be an example of a "browser" according to aspects of the present disclosure. The local server 43 may be an example of a "local server" according to aspects of the present disclosure.

What is claimed is:

1. A non-transitory computer-readable medium storing computer-executable instructions, the instructions comprising an application configured to, when executed by a processor of an information processing device, cause the processor to:
   accept an authentication instruction to initiate authentication for accessing a cloud server; and
   in response to accepting the authentication instruction, perform:
      activating a local server configured to cause the processor to serve as a web server of a local host; and
      activating a browser incorporated in the information processing device, and instructing the browser to display an authentication screen provided by the cloud server and to specify the local server as a redirection destination for a redirection request, the redirection request including authentication information acquired from the cloud server via the authentication screen,
   wherein the local server is further configured to, when executed by the processor, cause the processor to:
      in response to receiving a request from the browser after activating the browser, determine whether the received request is a particular request other than the redirection request;
      when determining that the received request is not the particular request, instruct the browser to display a completion screen including a result of the authentication, and terminate the local server; and
      when determining that the received request is the particular request, execute an operation responsive to the particular request, without terminating the local server.

2. The non-transitory computer-readable medium according to claim 1,
   wherein the local server is further configured to, when executed by the processor, cause the processor to:
      in response to receiving the request from the browser after activating the browser, determine whether the received request is the redirection request;
      when determining that the received request is the redirection request, instruct the browser to display the completion screen including the result of the authentication, and terminate the local server; and
      when determining that the received request is not the redirection request, execute an operation responsive to the received request, without terminating the local server.

3. The non-transitory computer-readable medium according to claim 1,
   wherein the computer-executable instructions further comprise:
      the local server as a part of the application; and
      the browser separate from the application.

4. The non-transitory computer-readable medium according to claim 1,
   wherein the application is further configured to, when executed by the processor, cause the processor to provide the browser with a URL of a web page of the authentication screen.

5. The non-transitory computer-readable medium according to claim 1,
   wherein the particular request causes, when responded to by the processor, no change in a web page of the authentication screen displayed by the browser.

6. The non-transitory computer-readable medium according to claim 1,
   wherein the particular request is a favicon request for the browser to display a favicon.

7. The non-transitory computer-readable medium according to claim 1,
   wherein the application is further configured to, when executed by the processor, cause the processor to:
      accept the authentication instruction via a user interface of the information processing device, in an active state of the application;
      in response to activating the browser, bring the browser into an active state, the browser being restored into the active state in response to being instructed to display the completion screen, the completion screen further including particular information for prompting a user to bring the application into the active state;
      after the authentication is successfully completed, accept an access instruction to access the cloud server via the user interface, in the active state of the application; and
      in response to accepting the access instruction, access the cloud server.

8. The non-transitory computer-readable medium according to claim 7,
   wherein the local server is further configured to, when executed by the processor, cause the processor to:
      provide the browser with web page data of the completion screen including the result of the authentication and the particular information; and
      instruct the browser to display the completion screen including the result of the authentication and the particular information, based on the web page data.

9. The non-transitory computer-readable medium according to claim 8,
   wherein the local server is further configured to, when executed by the processor, cause the processor to:
      determine whether the result of the authentication represents successful authentication, based on the authentication information included in the redirection request;
      in response to determining that the result of the authentication represents the successful authentication, provide the browser with the web page data of the completion screen including information representing the successful authentication; and
      in response to determining that the result of the authentication represents unsuccessful authentication, provide the browser with the web page data of the completion screen including information representing the unsuccessful authentication.

10. The non-transitory computer-readable medium according to claim 1,
   wherein the application is further configured to, when executed by the processor, cause the processor to:
      accept the authentication instruction via a user interface of the information processing device, in an active state of the application;
      in response to activating the browser, bring the browser into an active state;
      after the browser is instructed to display the completion screen, bring the application into the active state;

when the result of the authentication included in the completion screen represents successful authentication, accept via the user interface an access instruction to access the cloud server, in the active state of the application; and in response to accepting the access instruction, access the cloud server.

11. A non-transitory computer-readable medium storing computer-executable instructions, the instructions comprising an application configured to, when executed by a processor of an information processing device, cause the processor to:

accept an authentication instruction to initiate authentication for accessing a cloud server; and in response to accepting the authentication instruction, perform:

activating a local server configured to cause the processor to serve as a web server of a local host; and activating a browser incorporated in the information processing device, and instructing the browser to display an authentication screen provided by the cloud server and to specify the local server as a redirection destination for a redirection request, the redirection request including authentication information acquired from the cloud server via the authentication screen, wherein the local server is further configured to, when executed by the processor, cause the processor to:

in response to receiving the request from the browser after activating the browser, determine whether the received request is the redirection request;

when determining that the received request is the redirection request, instruct the browser to display the completion screen including the result of the authentication, and terminate the local server; and when determining that the received request is not the redirection request, execute an operation responsive to the received request, without terminating the local server.

12. An information processing device comprising:

a processor; and a memory storing processor-executable instructions comprising an application, a browser, and a local server, the application being configured to, when executed by the processor, cause the processor to:

accept an authentication instruction to initiate authentication for accessing a cloud server; and in response to accepting the authentication instruction, perform:

activating the local server configured to cause the processor to serve as a web server of a local host; and activating the browser, and instructing the browser to display an authentication screen provided by the cloud server and to specify the local server as a redirection destination for a redirection request, the redirection request including authentication information acquired from the cloud server via the authentication screen, wherein the local server is further configured to, when executed by the processor, cause the processor to:

in response to receiving a request from the browser after activating the browser, determine whether the received request is a particular request other than the redirection request;

when determining that the received request is not the particular request, instruct the browser to display a completion screen including a result of the authentication, and terminate the local server; and when determining that the received request is the particular request, execute an operation responsive to the particular request, without terminating the local server.

13. An information processing device comprising:

a processor; and a memory storing processor-executable instructions comprising an application, a browser, and a local server, the application being configured to, when executed by the processor, cause the processor to:

accept an authentication instruction to initiate authentication for accessing a cloud server; and in response to accepting the authentication instruction, perform:

activating the local server configured to cause the processor to serve as a web server of a local host; and activating the browser, and instructing the browser to display an authentication screen provided by the cloud server and to specify the local server as a redirection destination for a redirection request, the redirection request including authentication information acquired from the cloud server via the authentication screen, wherein the local server is further configured to, when executed by the processor, cause the processor to:

in response to receiving the request from the browser after activating the browser, determine whether the received request is the redirection request;

when determining that the received request is the redirection request, instruct the browser to display the completion screen including the result of the authentication, and terminate the local server; and when determining that the received request is not the redirection request, execute an operation responsive to the received request, without terminating the local server.

\* \* \* \* \*